Dec. 13, 1960  S. R. JOHNSON  2,964,006
METHOD FOR SOLDER BONDING CAN BODY SEAMS
Filed Sept. 7, 1954  5 Sheets-Sheet 1
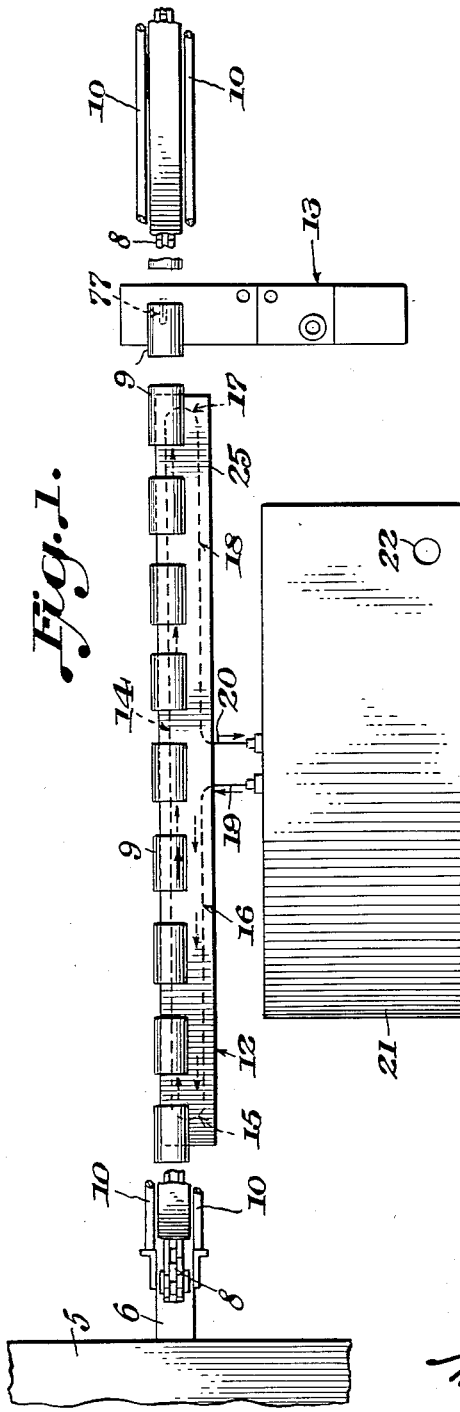
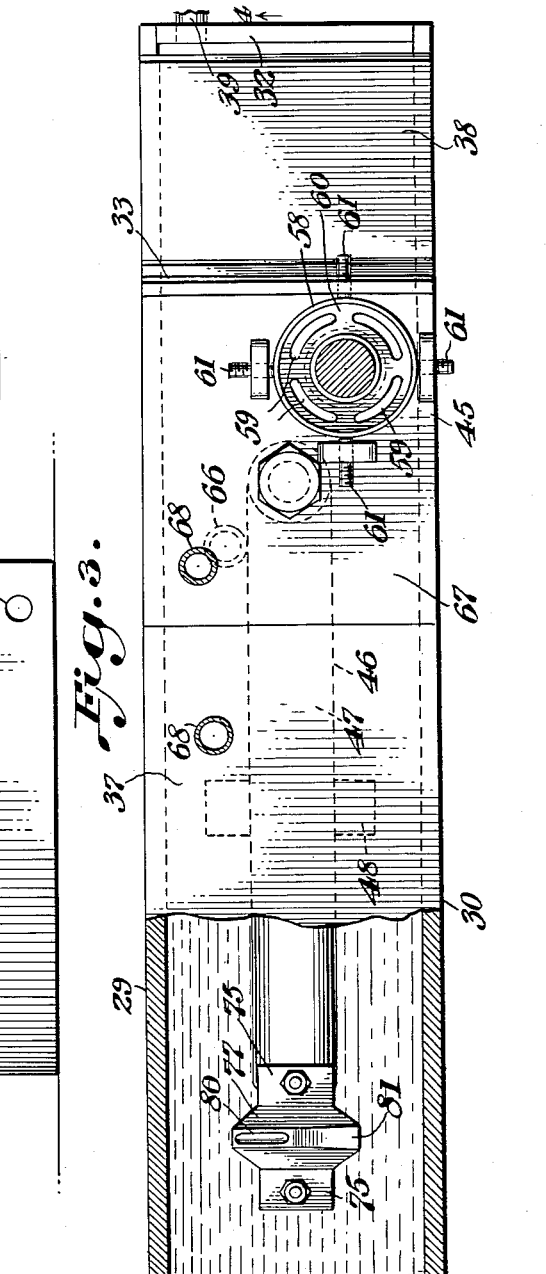
INVENTOR.
Scott R. Johnson.
BY
Munn, Potter, Miller & Stewart
ATTYS.

Dec. 13, 1960 S. R. JOHNSON 2,964,006
METHOD FOR SOLDER BONDING CAN BODY SEAMS
Filed Sept. 7, 1954 5 Sheets-Sheet 2
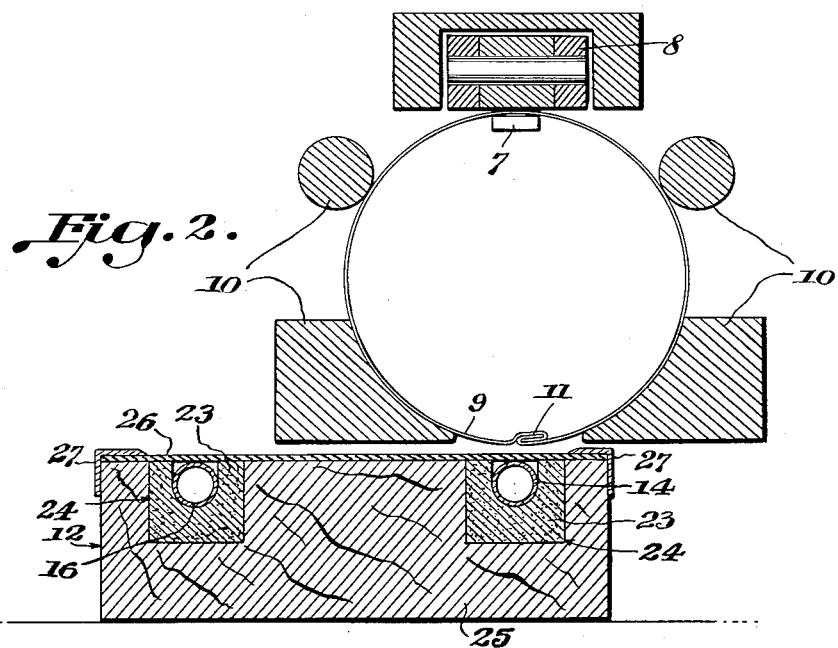
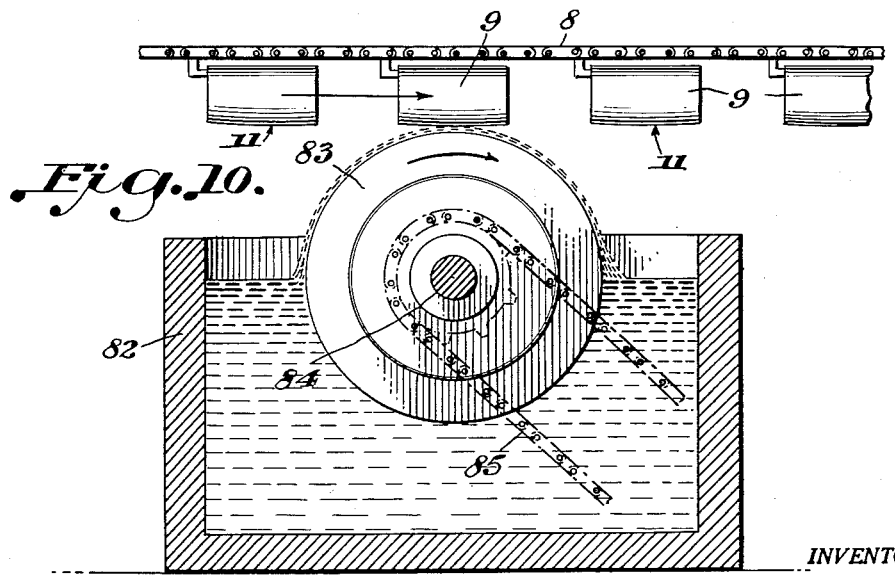
INVENTOR.
Scott R. Johnson.
BY
ATTYS.

INVENTOR.
BY Scott R. Johnson.

Dec. 13, 1960 S. R. JOHNSON 2,964,006
METHOD FOR SOLDER BONDING CAN BODY SEAMS
Filed Sept. 7, 1954 5 Sheets-Sheet 4
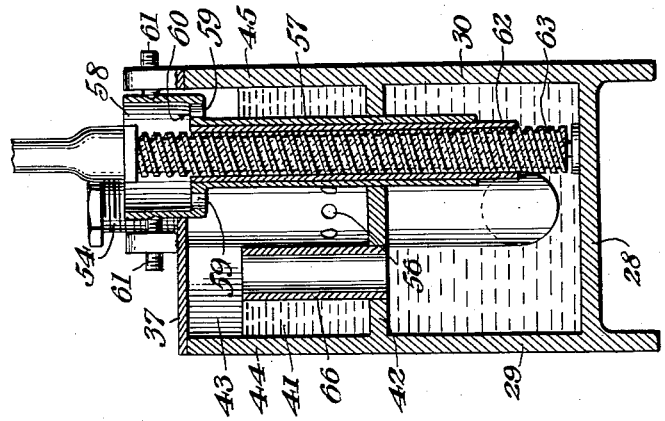
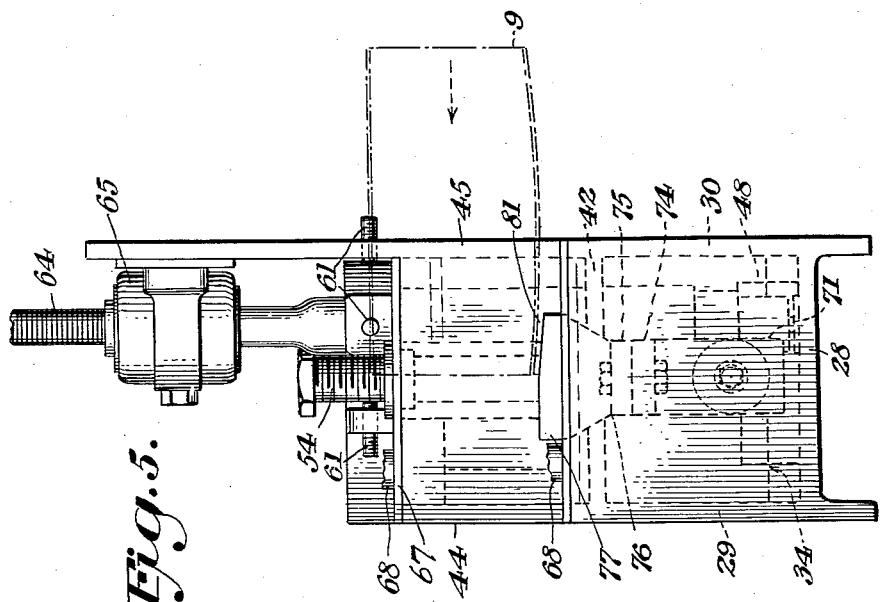
INVENTOR.
Scott R. Johnson.
BY
Mason, Porter, Diller & Stewart
ATTYS.

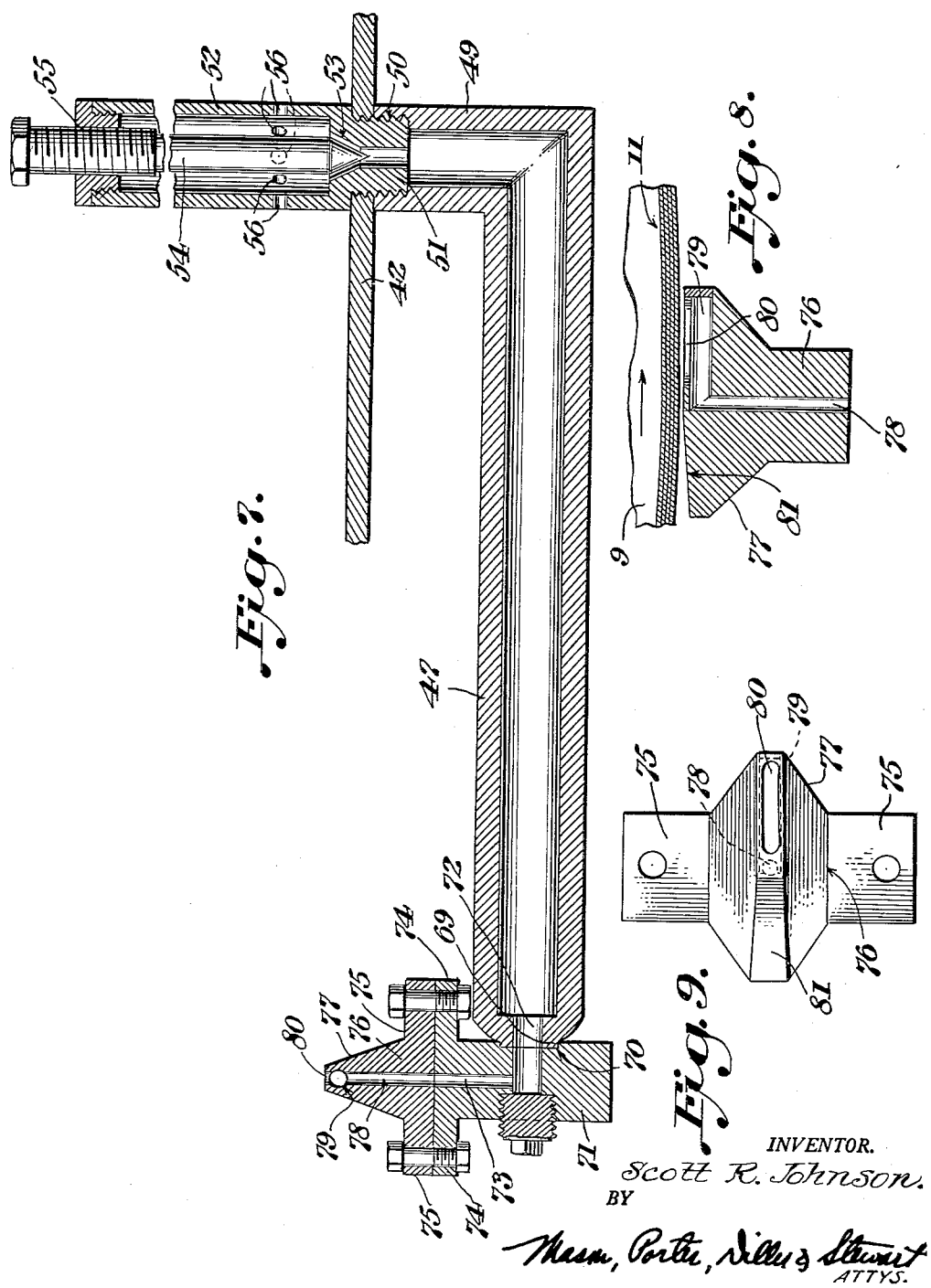

United States Patent Office 2,964,006
Patented Dec. 13, 1960

2,964,006

METHOD FOR SOLDER BONDING CAN BODY SEAMS

Scott R. Johnson, River Forest, Ill., assignor to Continental Can Company, Inc., New York, N.Y., a corporation of New York Filed Sept. 7, 1954, Ser. No. 454,422

1 Claim. (Cl. 113—120)

The invention relates generally to the art of making cans and primarily seeks to provide a novel method of and apparatus for solder bonding the side seams of can bodies.

In the present conventional manufacture of cans the can bodies are formed from prepared, rectangular blanks fed step-by-step to a horn about which they are formed to provide the desired shape and bring marginal edge portions thereof together in longitudinally extending side seam structures. In cans most commonly produced at the present time these side seams are of the simple lock and lap type, but seams of the even simpler lap type were extensively employed at one time, and again are in contemplation, and many and more complicated variations of the lap seams and combination lock and lap seams are being used and advanced as advantageous. The present invention contemplates improvement in the solder bonding of all such seams, both from the standpoint of the security of the bond and the rapidity with which it can be effected. After the can bodies are shaped in the manner stated, continuously driven means take over the feeding thereof and they are conveyed continuously and in processional order through a solder bonding station whereat a long soldering roll rotating about a horizontal longitudinal axis in a bath of molten solder applies solder to the external surfaces of the travelling can bodies, it being proposed that the solder thus applied will find its way into the can body seam structures by capillary action and securely bond them upon solidification of the solder. Obviously this practice has been commercially successful because millions of can bodies have been made in this manner. However, it is common knowledge that this conventional practice must be classed as acceptable only because better methods which were commercially feasible have not been devised heretofore, despite the fact that millions of dollars have been and are being spent in efforts to do away with known faults in present practices, such as wastage of solder, lack of uniformity and security in the bond, and the great amount of time necessary to be consumed in the formation of satisfactory bonds. Much solder is wasted because of the width of stripe which must be applied in the roll application method referred to, and surplus solder applied in this manner must be wiped from the travelling can bodies by passing them over a rapidly rotating wiper roll. This practice not only provides a relatively wide solder cut along the can body seam exteriors which hampers application of protective and decorative coatings and sometimes is unsightly, but the wiper roll also tends to spatter bits of solder into the interiors of the can bodies. Despite this application of an excess of solder at the exterior of the can body side seams, it has been found that the capillary action is only partially efficient in this practice in distribution of the bonding solder into all portions of the seam structures, and many voids have been detected and have resulted in the provision of leaky seams. The soldering roll rotating about its longitudinal axis tended to rub the solder into the relatively cold seam structures simultaneously throughout the full length thereof, causing gas pockets to form in the seam structures and interfere with the capillary attraction of the solder, and the surplus of applied solder outwardly of the seam entrance would freeze in an unsightly line. It has been found that by providing proper heat conditions in the can bodies and properly applied bonding solder, conditions which would be conducive to the attainment of full efficiency in the running of the bonding solder progressively and rapidly into all portions of the can body side seams by capillary action, these faults can be avoided. It might be said that each seam structure properly formed with its component parts in close contact has a great thirst for solder, and when a proper heat condition is provided in the seam structures and the bonding solder at the time the solder bonding is to be carried out, this thirst can be rapidly quenched and the solder caused to run progressively into all parts of the seam, by capillary attraction and without entrapment of gas, by merely touching the solder against a localized portion at the seam entrance.

In the conventional practices referred to there is no substantial or practical preheating of the can bodies prior to presentation thereof at the solder bonding station and such as would condition the seam structures for the efficient solder bonding contemplated herein. Known preheating has been carried out at relatively low temperature and for the purpose of merely driving off moisture from flux residue in the seams and preventing spitting upon application of the heat of the solder. Morover, the solder has been heated only to a degree assuring the necessary molten state thereof, in some instances as low as approximately 620° F. The result has been that the solder contacts the relatively cold can bodies, and while the temperature of the can bodies is increased somewhat as a result of this contact, this heat exchange is effective only in a very limited degree in tending to bring the seam structures up to a proper solder bonding temperature and the effect is to seriously retard and impair the efficiency of the capillary action tending to draw bonding solder into all parts of the can body seam structures. Therefore, it is a purpose of the present invention to provide an improved method of solder bonding can body seams which comprises, presenting the bonding solder for contact with the can body side seams over a limited area assuring against wasteful surplus application, preheating the can bodies and superheating the bonding solder prior to the application of the solder to the side seam structures so that during the actual solder bonding the solder will additionally heat the can body side seam area without giving up heat in an amount sufficient to reduce the bonding solder, at seam structure contact, to or anywhere near the melting point temperature of the solder, thereby to assure a very rapid and fully efficient capillary action and the formation of uniformly secure solder bonds.

An object of the invention is to provide a novel solder bonding method of the character stated wherein the sum of the temperatures applied respectively to the can body seam structures and to the bonding solder when divided by two will give a temperature at which an efficient solder bonding of the particular size of the side seam to be bonded can be carried out with the particular solder being employed in said bonding.

More specifically, the invention seeks to provide a novel method of solder bonding can body side seams which comprises presenting a very limited width supported crown of molten solder at a superheated temperature, and in position for being contacted by the side seam areas of can bodies being conveyed rapidly and in processional order, and preheating said can body side seam areas as they are approaching such solder contact to a temperature at least reaching the melting point of the tin on the can bodies, thereby to assure contact of the solder along the entrance into each side seam but only a very limited amount sidewise thereof, and very rapid and thorough entrance of the bonding solder into all portions of the seam structures by capillary action.

Another object of the invention is to provide a method of the character stated wherein the can body seam areas are preheated to a temperature of at least 450° F. and the bonding solder is preheated to a temperature of at least 950° F. when the seam areas are preheated to the temperature stated, it being permissible to preheat the bonding solder to lesser temperatures, however, when the seam areas are preheated to higher temperatures.

Another object of the invention is to provide a method of the character stated wherein the crown of solder is presented to the can body seam structures in the form of a continuous body moving at least as rapidly as the seam structures and in like direction and carried and backed up by a surface of rotation opposed to but always spaced from the entrances into the seam structures.

With the above and other objects in view that will hereinafter appear, the nature of the invention will be more clearly understood by reference to the following detailed description, the appended claim and the several views illustrated in the accompanying drawings.

In the drawings:

Figure 1 is a somewhat diagrammatic plan view illustrating the invention.

Figure 2 is an enlarged vertical cross section illustrating a can body passing over the side seam preheating means.

Figure 3 is an enlarged plan view illustrating the solder applying means.

Figure 5 is a left end elevation of the solder applying means.

Figure 6 is a detail vertical cross section illustrating the solder pump.

Figure 7 is a detail view illustrating the solder duct, valve and nozzle assembly.

Figure 8 is an enlarged fragmentary vertical longitudinal section through the solder applying nozzle and showing the relation of a can body passing thereover and the application of the crown of solder to the side seam structure.

Figure 9 is an enlarged detail plan view of the nozzle shown in Figure 8.

Figure 10 is a fragmentary vertical longitudinal sectional view showing another manner of applying the crown of solder to the side seams, in this example in the form of a rotating body carried by a disk or wheel rotating about an axis traversing the path of travel of the can bodies, said body being immersed in a bath of molten solder.

Figure 4:
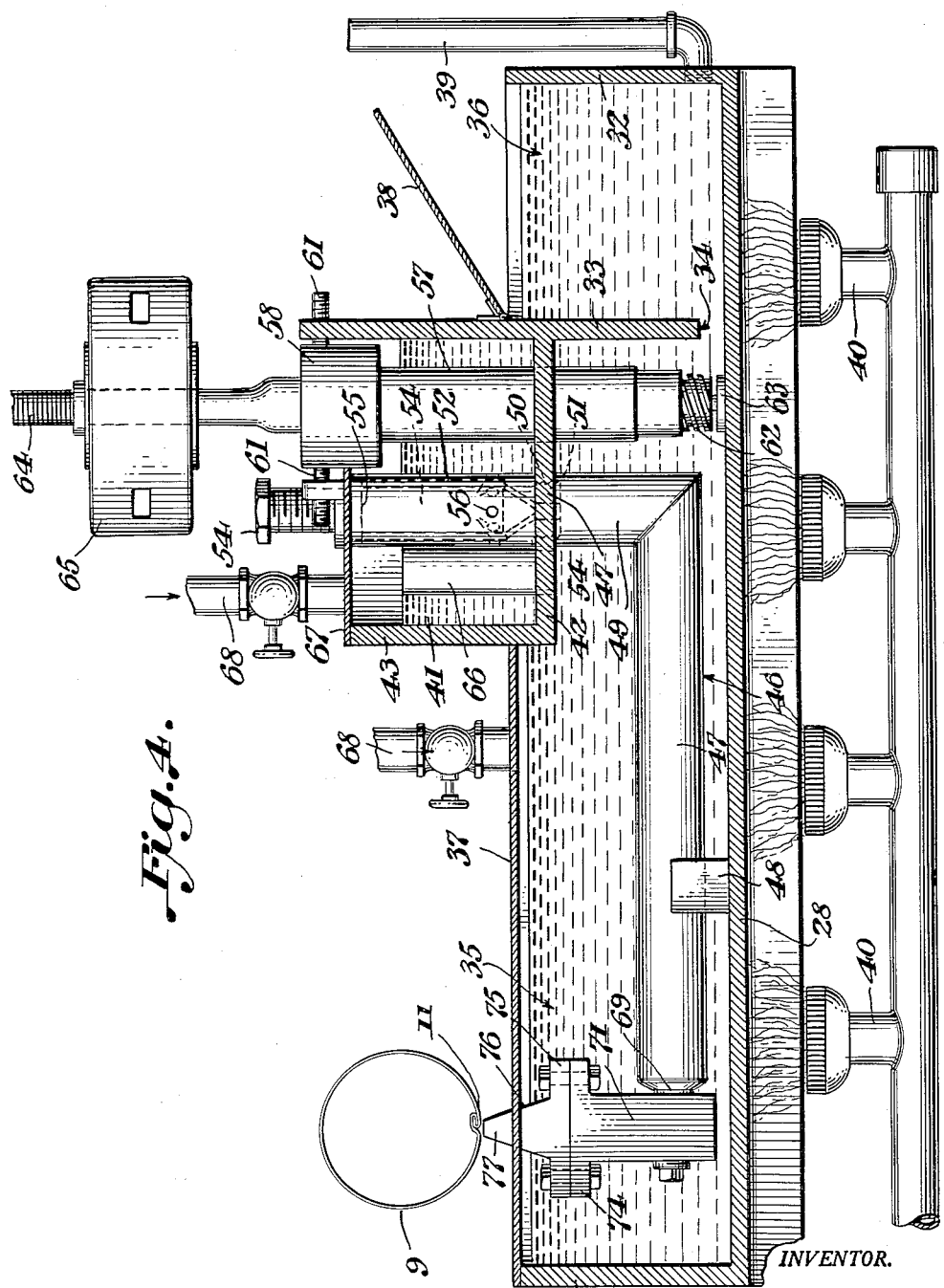
Figure 4 is a vertical longitudinal section taken on the line 4—4 of Figure 3.

In the example disclosure of the invention herein made the general arrangement of apparatus adapted for the practicing of the novel method is diagrammatically illustrated in Figure 1 wherein the arch of the body maker under which the can bodies are shaped into cylindrical form and have their side seams bumped in the well known manner as indicated at 5. As is well known the blanks from which the can bodies are formed are moved step-by-step to the shaping and bumping station by reciprocating feeders (not shown) and these feeders also feed the formed can bodies from said station to a point along the stub horn 6 at which they are picked up and fed along continuously in processional order and in spaced relation by the feeder lugs 7 on the feeder chain 8 to which movement is imparted by conventional means (not shown). The can bodies 9 are fed along in the usual outside horse 10 with their side seams 11 in line one with another and exposed through the lower opening between the opposing horse halves. See Figures 1 and 2.

Promptly after the taking over of the feeding of the can bodies 9 by the continuously driven feed chain 8 the bodies are fed over the side seam preheating means generally designated 12, and thence over the solder applying means generally designated 13. While passing over the preheating means 11 of the rapidly travelling can bodies 9 are preheated to approximately 450° F. along a very narrow strip including the full seam width, it being preferred to carry on the preheating so that there will be an appearance of a tin flow line in the seam area immediately in advance of the solder bonding. The melting point of tin is 449.6° F. and the carrying on of the solder bonding step with the can body side seams preheated to the melting point of the tin coating is a practical objective, although it is to be understood that the invention also comprehends a preheating well above the melting point of the tin coating. By now immediately following with the solder bonding step, with solder superheated to a temperature of at least 950° F., assuming a preheating of seam structures to the degree stated, the solder will find its way into all parts of each preheated side seam by capillary action and very strong, neat appearing solder bonds will be effected with substantially no wasting of solder and without any necessity for wiping the side seams along the solder cuts.

It is to be understood that the invention comprehends the preheating of can body side seam structures and the superheating of the bonding solder to various temperatures, the desideratum being always to apply preheat and superheat temperatures which when added will give a sum total twice the temperature necessary to be present in the bonding solder as it is being applied in a bonding process in progress in order to assure a fully efficient inflowing of the bonding solder by capillary action. This last stated temperature will vary as side seam areas being solder bonded and the bonding solder alloys may be varied. For example, assuming that conventional .260 side seams are being solder bonded and that a solder alloy of 2% tin and 98% lead is being employed, the temperature at which the solder bonding can be efficiently carried out would be approximately 700° F. It has been pointed out that it is preferred practice to preheat the side seam areas to approximately 450° F. and that under such circumstances the bonding solder would be superheated to at least 950° F. It follows that as the temperature of the preheating of the can body side seams may be increased, the temperature to which the bonding solder is superheated can be correspondingly lowered in the attainment of the approximately 700° F. bonding action temperature desired in the case of the stated example of seam area and bonding solder alloy.

The preheating of the can body side seams preferably is accomplished by employment of the induction heating means herein disclosed somewhat diagrammatically and generally designated 12, but it is to be understood that the invention comprehends the employment of any preheating means capable of bringing the rapidly travelling can body side seams to the desired temperature in a time interval which would be commercially feasible. The illustrated preheating means has been found practical and capable of preheating in one second and to temperatures well in excess of those hereinabove mentioned, the side seams of can bodies travelling at the rate of six hundred cans per minute, or four thousand five hundred inches per minute. This particular preheating means forms a part of the present invention only in combination, the individual means per se being covered in U.S. Letters Patent 2,818,843, issued to Leroy A. Blume on December 31, 1957.

The preheating means generally designated 12 comprises a copper tube or coil having an effective portion or leg 14 about six feet long and extending along the path of travel of the can bodies 9 close beneath but out of contact with the side seams 11 thereof. Said coil includes an advance loop 15 disposed at the end thereof first encountered by the travelling can bodies and connecting with a portion or leg 16 paralleling the main portion or leg 14, and a trailing end loop 17 connecting with a portion or leg 18 aligned with the leg 16 and paralleling the main leg 14. The legs 16 and 18 respectively connect about midway the length of the main leg 14 with laterally turned flow and return legs 19 and 20 through which a coolant is flowed into and returned from, or in other words is circulated through the induction heater coil structure.

The legs 19 and 20 of the induction heater coil are connected with any conventional form of high frequency generator 21 having a capacity for supplying the requirements of the coil for heating the can body side seams at the rate and the temperature range stated herein. Such units are well known and can be purchased on the open market and detailed disclosure herein is deemed unnecessary. When the heater coil flow and return legs 19 and 20 are connected with the unit the coolant will be circulated therethrough in the manner indicated by the arrows on Figure 1 and electrical energy for effecting the desired heating of the can body side seams will be supplied in the well known manner. The unit will include a control rheostat adjustable at 22 for varying the voltage output and the amount of energy the heater tube will put out, and therefore the temperature to which the can body side seams will be preheated. In an example arrangement employing a 5/16" copper heater coil of the kind disclosed having its parallel legs spaced 2½" from center to center, using 300 amps., 2200 volts and a frequency of 450 kilocycles in the tube, highly satisfactory results have been obtained. In this use the stray field effect about the main leg 14 only of the heater coil was used in order to obtain the desired intense concentrated heating along the narrow seam line.

In one practical installation the heater coil 14, 16, 18 was embedded in ferrite blocks 23 in recessing 24 formed in a suitable hard wood carrier 25 and covered with a suitable insulation 26, secured in place by plastic electrical tape 27, as shown in Figure 2.

The soldering means generally designated 13 includes a solder pot having a base 28, sides 29 and 30, and ends 31 and 32. A partition wall 33 extending above the sides and terminating short of the base, as at 34, divides the pot into a long molten solder reservoir or chamber 35 at one end, and a shorter filler chamber 36 at the other end.

It is preferred that a cover 37 be affixed over the main chamber 35, and a hinged cover 38 may be provided over the filler chamber 36 in order to facilitate the replenishing of the supply of solder. A drain tube 39 may be provided at the filler end of the pot as indicated in Figure 4. The drain tube may normally be retained in the upright position illustrated in Figure 4, and when it is desired to drain the solder pot the same may be turned downwardly.

As shown in Figure 4, gas burner means generally designated 40, and preferably temperature controlled by means not shown, may be employed to apply the heat for maintaining the solder in the desired molten and superheated state, or any other suitable heat applying means may be employed.

The upper part of the wall 33 may form one wall of a head chamber 41 otherwise defined by the base wall 42, an end wall 43, and upward extensions 44 and 45 of the side walls 29 and 30. See Figures 3, 4 and 5.

An L-shaped solder supply tube generally designated 46 is provided and includes a long horizontal leg 47 supported as at 48 just above the pot base 28 or in position to be immersed in the molten solder. The supply tube includes the upright short leg 49 extending upwardly against the head chamber base 42 and having a threaded socket 50 in its upper end extremity in which to receive the threaded extension 51 of the valve tube 52 maintained uprightly in the head chamber 41. It will be apparent that when the supply and valve tube portions are threadably connected the head chamber base 42 will be gripped between them. The valve tube 52 is equipped with a valve seat 53 to receive the needle valve 54 which is threadably mounted at 55 in the upper end of the valve tube. Molten solder is permitted to enter the interior of the valve tube 52 through side ports 56, and it will be apparent that by adjusting the needle valve 54 with relation to the valve seat 53 the rate of flow of the molten solder from the head chamber 41 downwardly through the seat 53 and into and through the supply tube 46 can be accurately controlled.

A pump case guide tube 57 extends downwardly through the base wall 42 of the head chamber 41, and this tube carries an enlarged cup 58 at its upper end. The cup is equipped with solder flow slots 59 in its annular base 60 so that solder pumped into the cup 58 can flow through the slots 59 down into the head chamber 41. The cup 58 is held centered by engagement of the adjustable abutment screws 61 therewith. A pump casing sleeve 62 is mounted in the tube 57 and extends downwardly through the lower end thereof to terminate in spaced relation above the solder pot base 28 in the manner illustrated in Figure 4. A multiple thread screw pump 63 is rotatable in the casing sleeve 62 and includes a projecting shaft portion extending well above the cup 58 where it is attached to a flexible drive shaft 64 through which rotation may be imparted to the screw pump from any suitable power supply source (not shown). The pump drive shaft extension is rotatably supported in the bearing 65 which may be rigidly secured to an upward extension of the wall 45, as shown in Figure 5.

An overflow stand pipe 66 is mounted on the head chamber base 42, the upper end thereof opening into said chamber and the lower end thereof discharging into the long molten solder chamber 35. It will be apparent that when rotation is imparted to the screw pump 63 the same will lift molten solder from the chamber 35 and deliver the same into the cup 58 from whence it will fall into the head chamber 41 through the arcuate slots 59. The position of the upper end extremity of the overflow pipe 66 will determine the level of the head of molten solder to be retained in the head chamber 41.

In order to reduce to a minimum oxidation taking place at the exposed upper face of the molten solder, a cover plate 67 is secured over the head chamber 41, and if desired, inert gas ducts 68 may be provided and directed through the cover plate 67 and the previously described cover plate 37 for directing an inert gas such as nitrogen into the main molten solder chamber 35 and the head chamber 41, the gas being introduced at low pressure and permitted to discharge through crevices which will naturally be present in the fabricated solder pot structure.

The horizontal leg 47 of the solder supply tube is reduced at 69 at its delivery end for engagement in the socket 70 provided in the nozzle base 71. The nozzle base may be secured on the end of the supply tube leg 47 by welding, or otherwise, and is equipped with a horizontal bore 72 communicating with the supply duct in the supply tube and with a vertical bore 73 also provided in the nozzle base. The vertical supply bore 73 opens upwardly through the top portion of the nozzle base which is equipped with mounting lugs 74 adapted to be removably secured to similar lugs 75 projecting from the lower portion of the nozzle 76. The nozzle 76 includes an elongated transversely spaced head extension 77 which is centered beneath and extends along the line of travel of the can bodies 9 and the side seams 11 thereof. An upright bore 78 is provided in the nozzle 76 and communicates at its lower end with the nozzle base bore 73 and opens at its upper end into a horizontal bore 79 adapted to receive and hold an elongated crown of solder in position for projecting upwardly through the elongated narrow top opening 80 for contact with the side seams 11 of can bodies rapidly travelling thereover. The upper surface of the nozzle 76 leading up to the solder supply opening 80 is tapered or angled downwardly at 80 in a manner for assuring against jamming contact with the oncoming advance end portions of deformed can bodies.

It is to be noted that the discharge opening 80 in the nozzle is disposed at a level considerably below the top surface of the head of molten solder in the chamber 41, and by this means it is assured that the desired supply of molten solder will be discharged through the nozzle opening 80 by gravity action. However, it is to be understood that the amount of solder which will be presented by gravity action at the discharge outlet 80 of the nozzle is not that which would flow under pressure of the available solder head in the chamber 41 without control by the adjustable needle valve 54. As before stated, the rate of flow of solder from the head chamber 41 into and through the supply tube 46 can be controlled by adjustment of the needle valve 54 so as to meet the requirements dictated by the rapidity at which the can bodies 9 are being conveyed over the nozzle outlet.

The particular nozzle arrangement serves to present the solder crown at a limited area or concentrated point, and by reason of the preheating of the can body side seams and the superheating of the molten solder, the solder contacting the can body side seams at the localized position against the entrance into said seams will suddenly quench the great thirst of each seam for solder and will be drawn very rapidly into all portions of the moving seam structures by capillary action, substantially without any waste and without necessity for any subsequent wiping of the seams.

It is also known that the heat application serves to bow the can body side seams or belly them outwardly somewhat as indicated in Figures 5 and 10, and this condition greatly facilitates passage of the can body side seams in the desired contact with the crown of molten solder at the nozzle outlet 80 without any problem of the advance end edge portions of the seam structures dipping into the solder.

It will be apparent by reference to Figures 1 and 2 that the can bodies 9 are rapidly conveyed over the long leg 14 only of the heater coil, in close proximity thereto but out of contact therewith, and the desired preheating of the can body side seams is brought about by the stray field effect over this single coil leg setting up a surrounding magnetic field passing transversely through the side seam structures and causing magnetic disturbances within the seam structure components and a resultant and rapid generation of the heat desired. By tuning or controlling the high frequency generator 21 through manipulation of the conventional control 22 it is possible to vary the intensity of the heat to be applied to the travelling can body side seams structures in accordance with the speed at which the can bodies are being conveyed.

The nozzle structure of Figures 3, 5, 7 and 8 is but an example of means for presenting a crown of solder of very limited width in position for being contacted by the side seam areas of can bodies being rapidly conveyed in the direction of their axes and with their side seams aligned one with another. The molten solder is moving along in the narrow discharge opening 80 in the direction in which the can bodies are travelling, and the bottom of the horizontal bore 79 backs up the solder as the crown is contacted and depressed or widened slightly by the passing can body side seams. As the surface tension of the solder crown is broken by the seam contact, the back up action of the base of the bore 79 will assure that the solder will be presented upwardly into each seam entrance without any need for any mechanical rubbing action or ironing of the solder against the seam areas.

Another example of solder crown presentation for travelling can body side seam contact is shown in Figure 10 wherein a solder pot is indicated at 82 with a solder applying disk 83 immersed therein on a shaft 84 rotatable about an axis disposed transversely with relation to the direction of travel of the can bodies 9. The shaft is disposed so that the upper peripheral portion of the disk closely approximates but is out of contact with the side seams 11 passing thereover, the shaft being driven by sprocket and chain means 85 from a suitable power source (not shown) so that said peripheral portion travels at a speed slightly in excess of the lineal speed of the moving can bodies. By reason of the fact that the disk is immersed in the molten solder bath at its lower portion, the action of centrifugal force presents a tire-like crown of solder at the upper peripheral portion of the disk in position for being contacted by the passing can body side seams in the manner indicated in Figure 10. Thus the crown of solder is presented in the form of a continuous body moving at least as rapidly as the contacting seam structures and in like direction and carried by a surface of rotation opposed to but always spaced from the entrances into the seam structures. As in the previously described example each passing can body side seam will contact and depress or slightly widen the solder crown against the surface of rotation backing the same, and this will assure that even badly oriented side seam entrances will engage over the solder crown. Again, as the surface tension of the solder crown is broken by the seam contact, the back up action of the disk periphery, in this instance aided by centrifugal force, will assure that the solder will be presented upwardly into each seam entrance, as before stated.

Structurally, the solder carrying disk and its arrangement are covered in a copending application for U.S. Letters Patent, Serial No. 540,686, filed by Willard B. Eastman and Philip F. Catalano on October 17, 1955, now Patent No. 2,900,944.

While example method steps and apparatus structures are disclosed herein it is to be understood that said steps and structures may be varied without departing from the spirit and scope of the invention as defined in the appended claim.

I claim:

The herein described method of solder bonding rapidly moving tin plated can body interlocked side seams which comprises rapidly feeding the can bodies in the direction of their axes and with their side seams aligned one with another, preheating the can body side seams to the melting point of the tin plating by high frequency induction heating applied only in a narrow line at the side seam area but simultaneously over the length of a plurality of rapidly moving can bodies while the can bodies are being fed along, providing bonding solder of approximately 98% lead and 2% tin and having a melting point of approximately 600° F., super-heating the bonding solder to at least 950° F. and applying it in the form of a very narrow longitudinally extending crown touched without mechanically rubbing contact against the entrance into each preheated and travelling side seam to run into all portions thereof by capillary action.

References Cited in the file of this patent

UNITED STATES PATENTS

| | | |
|---|---|---|
| 485,906 | Brown | Nov. 8, 1892 |
| 925,045 | Smith | June 15, 1909 |
| 1,542,664 | Brenzinger | June 16, 1925 |
| 1,935,646 | Luthi | Nov. 21, 1933 |
| 1,941,526 | Adams | Jan. 2, 1934 |
| 1,969,803 | Kruse | Aug. 14, 1934 |
| 1,974,641 | Burns | Sept. 25, 1934 |
| 1,983,160 | Adams | Dec. 4, 1934 |
| 2,024,906 | Bennett | Dec. 17, 1935 |
| 2,054,086 | Jones | Sept. 15, 1936 |
| 2,085,737 | Cereghino | July 6, 1937 |
| 2,116,458 | Winterling | May 3, 1938 |
| 2,193,955 | Weisenburg et al. | Mar. 19, 1940 |
| 2,344,589 | Bogner | Mar. 21, 1944 |
| 2,430,219 | Elser | Nov. 4, 1947 |
| 2,455,774 | Johnson | Dec. 7, 1948 |
| 2,469,392 | Jones | May 10, 1949 |
| 2,597,893 | Nordquist | May 27, 1952 |